US011453779B2

(12) United States Patent
Slaghek et al.

(10) Patent No.: US 11,453,779 B2
(45) Date of Patent: Sep. 27, 2022

(54) BITUMEN COMPOSITION

(71) Applicant: NEDERLANDSE ORGANISATIE VOOR TOEGEPAST-NATUURWETENSCHAPPELIJK ONDERZOEK TNO, The Hague (NL)

(72) Inventors: Theodoor Maximiliaan Slaghek, The Hague (NL); Dave Van Vliet, The Hague (NL); Cecile Giezen, The Hague (NL); Ingrid Karin Haaksman, The Hague (NL)

(73) Assignee: NEDERLANDSE ORGANISATIE VOOR TOEGEPAST-NATUURWETENSCHAPPELIJK ONDERZOEK TNO, S'-Gravenhage (NL)

( * ) Notice: Subject to any disclaimer, the term of this patent is extended or adjusted under 35 U.S.C. 154(b) by 814 days.

(21) Appl. No.: 15/125,268

(22) PCT Filed: Mar. 13, 2015

(86) PCT No.: PCT/NL2015/050163
§ 371 (c)(1),
(2) Date: Sep. 12, 2016

(87) PCT Pub. No.: WO2015/137813
PCT Pub. Date: Sep. 17, 2015

(65) Prior Publication Data
US 2017/0096558 A1 Apr. 6, 2017

(30) Foreign Application Priority Data
Mar. 13, 2014 (EP) .................... 14159436

(51) Int. Cl.
C08L 95/00 (2006.01)
C08L 97/00 (2006.01)

(52) U.S. Cl.
CPC ............. C08L 95/00 (2013.01); C08L 97/002 (2013.01); C08L 97/005 (2013.01); C08L 2555/82 (2013.01)

(58) Field of Classification Search
CPC ........ C08L 95/00; C08L 97/00; C08L 97/005; C08L 97/02; C08L 2555/82
See application file for complete search history.

(56) References Cited

U.S. PATENT DOCUMENTS 5,320,671 A  6/1994 Schilling
5,328,505 A  7/1994 Schilling
(Continued)

FOREIGN PATENT DOCUMENTS

WO  9714747 A1  4/1997
WO  2005100312 A2  10/2005
(Continued)

OTHER PUBLICATIONS

Ronald L. Terrel et al. "Evaluation of Wood Lignin as a substitute or extender of asphalt" Oct. 1980 Federal Highway Administration. FHWA/RD-80/125 (Year: 1980).*
(Continued)

Primary Examiner — Alexandra M Moore
(74) Attorney, Agent, or Firm — Lucas & Mercanti, LLP

(57) ABSTRACT

The invention is directed to a bitumen composition, to a paving, to a roofing, to a method for preparing a bitumen composition, to a method for increasing the stiffness of a bitumen composition, to a method of adjusting the physical properties of a bitumen composition, and to the use of a bitumen composition. The bitumen composition of the invention comprises a lignin compound or derivative thereof, wherein 10 wt. % or more by weight of said lignin compound or derivative thereof is molecularly dissolved in said bitumen composition.

18 Claims, 2 Drawing Sheets

(56) References Cited

U.S. PATENT DOCUMENTS 5,683,497 A 11/1997 Suchanec
2012/0247617 A1* 10/2012 Berlin .................... A61K 36/15
  144/344
2012/0329100 A1 12/2012 Uraki et al.

FOREIGN PATENT DOCUMENTS

WO  2011071386 A1  6/2011
WO  2012160116 A1  11/2012

OTHER PUBLICATIONS

Wang, Hao and Derewecki, Kristen "Rheological properties of asphalt binder partially substituted with wood lignin" 2013 Airfield and Highway Pavement Conference Jun. 9-12, 2013 LA, California ISSN/ISBN: 9780784413005 doi:10.1061/978784413005.081 (Year: 2013).*
Yao Xie et al "Enzymatic Hydrolysis Lignin Epoxy Resin Modified Asphalt". Advanced Materials Research vols. 239-242 pp. 3346-3349 2011 (Year: 2011).*
Sundstrom et al., "Use of Byproduct Lignins as Extenders in Asphalt", Ind. Eng. Chem. Prod. Res. Dev., 1983, vol. 22, No. 3, pp. 496-500.
International Search Report for International Application No. PCT/NL2015/050163 (dated Aug. 3, 2015) (3 pages).
Williams et al., "The Utilization of Agriculturally Derived Lignin as an Antioxidant in Asphalt Binder", InTrans Project Reports, 2008, pp. 1-94.

* cited by examiner

BITUMEN COMPOSITION

CROSS-REFERENCE TO RELATED APPLICATIONS

This application is a 371 of PCT/NL2015/050163, filed Mar. 13, 2015, which claims the benefit of European Patent Application No. 14159436.6, filed Mar. 13, 2014.

FIELD OF THE INVENTION

The invention is directed to a bitumen composition, to a paving, to a roofing, to a method for preparing a bitumen composition, to a method for increasing the stiffness of a bitumen composition, to a method of adjusting the physical properties of a bitumen composition, and to the use of a bitumen composition.

BACKGROUND OF THE INVENTION

Bitumen is the heaviest portion from the oil distillation process and, as such, the residue left over from petroleum distillation. Due to the different origins and distillation processes of such oils, the resulting bitumen may have a wide range of properties and characteristics. Typically, bitumen is characterised by the presence of four substance classes each having a different range of molecular weights: saturates, aromatics, resins, and asphaltenes.

Bitumen is widely used in different application, such as aggregate blends for road paving, fibre reinforced membranes for roofing and bitumen-water emulsions in surface treating both for paving and roofing. In such mixtures, the bitumen acts as a binder material which is mixed with aggregates that can be of different size, shape and chemical nature. These mixtures are particularly used for construction or maintenance of sidewalks, roads, highways, parking lots or airport runways and service roads and any other rolling surfaces.

There are significant differences between bitumen terminology in Europe and the United States. Whereas in Europe the terms "bitumen" or "asphaltic bitumen" are used, the same material is referred to as "asphalt", "asphalt cement" or "asphalt binder" in the United States. In order to avoid confusion, the European terminology will be adhered to in this application.

The worldwide demand for bitumen lies around 200 million tons. Currently, there are no alternative bonding agents for production of asphalt which could replace bitumen in view of its significant availability at an acceptable price.

The global demand for energy continues to rise while reserves of conventional petroleum (e.g. oil, gas, and natural gas liquids) are in decline. A peak in oil production imposed by dwindling petroleum reserves raises the possibility of a global energy crisis, particularly if the demand for energy continues to rise as predicted. Hence, there is increased focus on the exploitation of previously unconventional resources. Also, for bitumen there has been a growing interest in decreasing the petroleum based sources and providing more environmentally friendly and renewable alternatives.

Lignin from biomass represents a potential substitute for part of the bitumen binder in asphalt compositions. Lignin constitutes about 20% of photosynthetic biomass and is an abundant renewable resource. The conversion of cellulose and hemicellulose components of biomass to alcohol fuels is currently under extensive investigation. As these processes become commercial, substantial quantities of lignin by-product will be generated.

Lignin is derived from the Latin term "lignum", which means wood. Lignin has been described as a random, three-dimensional network polymer comprised of variously linked phenylpropane units. Lignin is the second most abundant biological material on the planet, exceeded only by cellulose and hemicellulose, and comprises 15-25% of the dry weight of woody plants. This macromolecule plays a vital role in providing mechanical support to bind plant fibres together. Lignin also decreases the permeation of water through the cell walls of the xylem, thereby playing an intricate role in the transport of water and nutrients. Finally, lignin plays an important function in a plant's natural defence against degradation by impeding penetration of destructive enzymes through the cell wall. Although lignin is necessary to trees, it is undesirable in most chemical papermaking fibres and is removed by pulping and bleaching processes.

The form and structure of these new biomass lignins will depend on the source of biomass, the conversion process, and the conditions of operation. Although the chemical structure of native lignin is not entirely known, it is generally agreed that lignin is a complex polymer based on phenylpropane units. The complexity of lignin results from the many ways in which these groups can be linked together. Lignins have structural similarities to the aromatic and asphaltene fractions of bitumen mixtures in that both contain similar unsaturated aromatic rings joined by alkyl chains. Since lignin also has adhesive properties, its use in bitumen has been previously suggested.

Extracting native lignin from lignocellulosic biomass during pre-treatment processes such as pulping processes generally results in lignin fragmentation into numerous mixtures of irregular components. Furthermore, the lignin fragments may react with any chemical employed in the pulping process. Consequently, the generated lignin fractions can be referred to as lignin derivatives and/or technical lignins. As it is difficult to elucidate and characterise such complex mixture of molecules, lignin derivatives are usually described in terms of the lignocellulosic plant material used, and the methods by which they are generated and recovered from lignocelluloic plant material, e.g. hardwood lignins, softwood lignins, and annual fibre lignins.

Lignin is available in large quantities, being the unwanted by-product of pulping process for papermaking. The process produces a pulp rich in cellulose and a liquor rich in degraded lignin that is typically burned for energy. The most important chemical pulping process is the Kraft-process using sodium sulphide and sodium hydroxide. Other pulping processes are the soda, anthraquinone, polysulfide, sulphite and organosolv processes. Depending on the process used, the obtained lignin has differing properties. There is, for instance, a large difference in the water-solubility of lignin from different pulping processes, e.g. lignosulphonates from sulphite pulping are water-soluble in the presence of suitable counter-ions, whereas Kraft lignin is water-soluble only in a highly alkaline environment.

Given that lignin derivatives are available from renewable biomass sources there is an interest in using these derivatives in certain industrial applications. For example, lignin derivatives obtained via organosolv extraction, such as those produced by the Lignol® process (e.g. Alcell®), have been used in rubber products, adhesives, resins, plastics, asphalt, cement, casting resins, agricultural products, oil-field products and as feedstocks for the production of fine chemicals.

Furthermore, in order to fine tune the properties of lignin derivatives for specific applications, various chemical modifications have been reported.

For example, Malutan et al. (*BioResources* 2008, 3(4), 1371-1376) describe the chemical modification of lignin through hydroxymethylation and epoxidation. Hydroxymethylation of lignin consists of a reaction of lignin with formaldehyde in an alkaline medium. Through this type of reaction, hydroxymethyl groups are introduced in the lignin's reactive positions, mainly in ortho positions (in relation to phenolic OH groups) of aromatic rings.

Winarni et al. (*BioResources* 2013, 8(2), 2195-2208) describe the preparation of an amphiphatic lignin derivatied by the reaction of lignin with poly(ethylene glycol)diglycidyl ether. The preparation involves the reaction of acetic acid lignin with poly(ethylene glycol) diglycidyl ether, ethoxy-(2-hydroxy)-propoxy-poly(ethylene glycol) glycidyl ether, or dodecyloxy-poly(ethylene glycol)glycidyl ether in an aqueous solution of sodium hydroxide.

US-A-2012/0 329 100 describes an enzyme stabiliser comprising a lignin derivative produced by the reaction between a lignin and a hydrophilic compound. The hydrophilic compound can be a glycidyl ether-based compound.

Currently, the pulp and paper industry forms the main source of lignin. These industries produce large quantities of lignin by kraft (sulphate pulping) and sulphite pulping processes. These processes yield lignin derivatives with a relatively high content of sulphur (e.g. in the form of lignosulphonates). The presence of this sulphur content renders the lignin unsuitable for many applications. As a result, most kraft lignin is burned to recover energy.

Sulphite and kraft pulping processes are noted for their contribution to air and water pollution, which requires costly pollution control equipment to bring kraft and sulphite pulping operations into environmental compliance. These pulping technologies can now be economically replaces by more environmentally friendly processes. One of these processes is the organosolv pulping process which has minimal impact on the environment. Unlike the traditional sulphite process, the organosolv process allows for the recovery of a highly pure, essentially sulphur-free and hydrophobic form of lignin with low water solubility. In this context, essentially sulphur-free refers to essentially free from elemental sulphur and covalently bound sulphur. Sulphur salts and sulphate ions may still be present.

It has been reported that lignin and derivatives thereof can be used as emulsifiers in bitumen dispersions in the form of particulates. For instance, U.S. Pat. Nos. 5,320,671, 5,328, 505 both describe cationic aqueous bituminous aggregate slurries wherein kraft lignin or maleinised kraft lignin is present as a cationic emulsifier.

Sundstrom (*Ind. Eng. Chem. Prod. Res. Dev.* 1983, 22, 496-500) describes the use of lignin from exploded wood as an extender for bitumen in paving mixtures. The lignin used by Sundstrom is precipitated from solution in the form of small spherical particles, is water insoluble, has a number average molecular weight near 700 g/mol, and has ultraviolet and infrared spectra similar to milled wood lignin. The lignin particles are present in the bitumen composition as dispersed particles and serve to increase the viscosity and the stability of the composition.

Also, the conversion of a lignocellulosic biomass into a pyrolysis oil for the production of bio-bitumen is known. The aromatic fraction of the oil can be used as a bio alternative for petrochemically obtained bitumen, such as for roofing. The aromatic fraction of the oil, however, typically has a relatively low molecular weight. This product is commercially marketed as BIOtumen by Biomass Technology Group.

SUMMARY OF THE INVENTION

An objective of the invention is to overcome one or more of the disadvantages faced in the prior art.

A further objective of the invention is to provide a bitumen composition of which at least part of the starting materials is not petrochemical based.

Yet a further objective of the invention is to provide a bitumen composition which upon replacement of at least part of the petrochemical starting materials maintains its favourable properties.

Yet a further objective of the invention is to provide a bitumen of which it is possible to tune the properties depending on the application.

The inventors found that one or more of these objectives can, at least in part, be met by molecularly dissolving lignin or a derivative thereof in a bitumen composition.

DETAILED DESCRIPTION OF THE INVENTION

Figure 1:
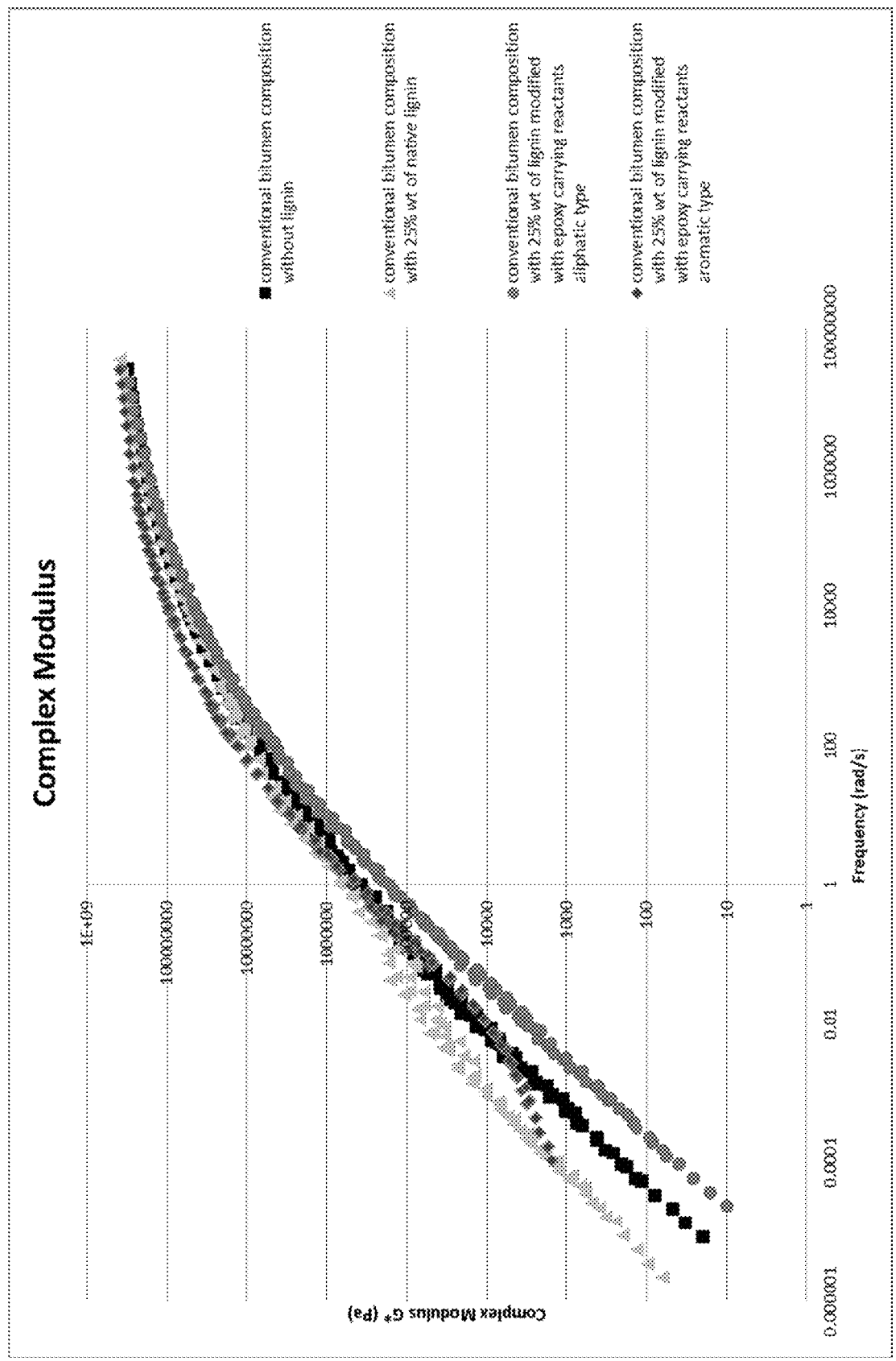
FIG. 1 is a graph illustrating the complex modulus of three different bitumen compositions described in Example 2.

Accordingly, in a first aspect the invention is directed to a bitumen composition comprising a lignin compound or derivative thereof, wherein 10 wt. % or more by weight of said lignin compound or derivative thereof is molecularly dissolved in said bitumen composition as determined at a temperature of 25° C.

The invention is also directed to a bitumen composition comprising a lignin compound or derivative thereof, wherein the average particle size of the lignin compound or derivative thereof in the composition at 25° C. is 100 μm or less as determined by polarised light microscopy.

It was surprisingly found that the bitumen composition of the invention has a highly desirable application temperature in the range of −10 to 60° C. Additionally, the bitumen composition has improved stiffness. This is highly advantageous, for instance in paving applications where wear due to rutting can be significantly decelerated. Consequently, the paving less frequently requires maintenance which accordingly reduces costs.

The term "bitumen" as used in this application is meant to refer not only to the product from oil by direct distillation or from distillation of oil at reduced pressures, but also to the product coming from the extraction of tar and bituminous sands, the product of oxidation and/or fluxation of such bituminous materials, as well as to blown or semi-blown bitumens, and synthetic bitumens. Hence, the terms tar, resin and pitch, as well as other bituminous substances, are regarded as falling within the term "bitumen" as used herein.

It is known that lignin does not have a single chemical structure. In fact, according to the Kirk Othmer Encyclopedia, the exact chemical structure of lignin, as it occurs in wood, is not known and because it is hard to extract from wood without changing its structure, the exact structure may never be known. While there are many variations of lignin, the term "lignin compound or derivative thereof", as used in this application is meant to refer to any polymer comprising p-hydroxyphenyl units, syringyl units, and guaiacyl units.

Plant lignins can be broadly divided into three classes: softwood (gymnosperm), hardwood (angiosperm) and grass or annual plant (graminaceous) lignin. Three different phenylpropane units, or monolignols are responsible for lignin biosysnthesis. Guaiacyl lignin is composed principally of coniferyl alcohol units, while guaiacyl-syringyl lignin contains monomeric units from coniferyl and sinapyl alcohol. In general, guaiacyl lignin is found in softwoods while guaiacyl-syringyl lignin is present in hardwoods. Graminaceous lignin is composed mainly of p-coumaryl alcohol units. These three lignin precursors can be represented by the general formula (I) below.

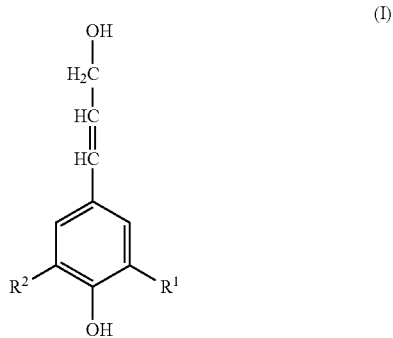

If in formula (I) $R^1$ is a methoxy group and $R^2$ is a hydrogen atom, then the compound is a coniferyl alcohol which is the principal building block of guaiacyl lignin. If in formula (I) both $R^1$ and $R^2$ are methoxy groups, then the compound is a sinapyl alcohol which is the principal building block of syringyl lignin. If in formula (I) both $R^1$ and $R^2$ are hydrogen atoms, then the compound is a p-coumaryl alcohol which is the principal building block of graminaceous lignin.

The term "molecularly dissolved" as used in this application is meant to refer to a composition wherein the lignin compound or derivative thereof is present in molecularly dispersed form rather than dispersed in particulate or aggregate dispersed form. Hence, the requirement that 10 wt. % or more by weight of the lignin compound or derivative thereof is molecularly dissolved in said bitumen composition means that 10 wt. % or more by weight of the lignin compound or derivative is molecularly dispersed rather than dispersed in particulate or aggregate form. The remaining weight percentage of lignin compound or derivative can be present in the bitumen composition in particulate or aggregate form.

There are a number of ways in which the skilled person can determine whether 10 wt. % of more by weight of the lignin compound or derivative thereof is molecularly dissolved in the bitumen composition. One way is to record a fluorescence microscope image of said bitumen composition by exciting the bitumen composition with a halogen lamp 12 V 100 W and detecting the fluorescence with Axiovision LE 64 software using a G436, FT510 and LP520 cut-off filter. The bitumen composition in any case meets the above requirement of having 10 wt. % or more of molecularly dissolved lignin compound or derivative thereof when the image has a fluorescence intensity ratio between brighter lignin particles having a particle diameter (or in case of a non-spherical particle an equivalent spherical particle diameter) of more than 100 µm and darker continuous bitumen phase of 5 or less, preferably 4 or less, more preferably 3 or less. Hence, in an embodiment a fluorescence microscope image of the bitumen composition obtained by exciting the bitumen composition with a halogen lamp 12 V 100 W and detecting the fluorescence with Axiovision LE 64 software using a G436, FT510 and LP520 cut-off filter has a fluorescence intensity ratio between i) brighter lignin particles having a particle diameter (or in case of a non-spherical particle an equivalent spherical particle diameter) of more than 100 µm (determined at 25° C. by polarised light microscopy) and ii) darker continuous bitumen phase, of 5 or less, preferably 4 or less, more preferably 3 or less.

Another option for the person skilled in the art is by determining the average particle diameter (or average equivalent spherical particle diameter) of the particles in the bitumen composition directly after mixing the components (i.e. bitumen component and lignin component) together and determining the average particle diameter after 20 minutes of mixing. If the average particle diameter after 20 minutes has decreased with 10% or more, then the bitumen composition in any case meets the above requirement of having 10 wt. % or more of molecularly dissolved lignin compound or derivative thereof. Hence, in an embodiment the average particle diameter in the bitumen composition after 20 minutes of mixing is 90% or less of the average particle diameter in the bitumen composition directly after mixing the components together. Preferably, the average particle diameter in the bitumen composition after 20 minutes of mixing is 70% or less of the average particle diameter in the bitumen composition directly after mixing the components together, more preferably 50% or less and even more preferably 25% or less. As will be described below, the average particle size of the particles after 20 minutes of mixing is preferably 100 µm or less when determined at 25° C., more preferably 80 µm or less, and even more preferably 50 µm or less, such as in the range of 3-30 µm, 5-25, or 7-20 µm.

The bitumen composition of the invention preferably comprises 10 wt. % or more by weight of the bitumen composition of the lignin compound or derivative thereof, more preferably 20 wt. % or more, and even more preferably 25 wt. %, such as 30 wt. %. The properties of the bitumen composition may deteriorate when the composition comprises more than 60 wt. % by weight, or more than 50 wt. %, of the bitumen composition of the lignin compound or derivative thereof. In an embodiment, the amount of lignin compound or derivative thereof in the bitumen composition is in the range of 10-50 wt. % by weight of the bitumen composition, such as in the range of 20-40 wt. %.

It is advantageous if the lignin compound or derivative thereof is substantially free of sulphur. As indicated above, this expression is intended to refer to substantial absence of elemental sulphur and covalently bound sulphur. The expression "substantial absence" typically refers to contents of less than 1% sulphur, preferably less than 0.5% sulphur, more preferably less than 0.1% sulphur. In an embodiment, the lignin compound or derivative thereof is completely free of sulphur. Such sulphur-free lignin is, for example, known from WO-A-97/14747, the content of which is herewith completely incorporated by reference. The amount of elemental sulphur in the lignin compound or derivative thereof can be determined with Soxhlet extraction (Harwood et al. in "*Experimental organic chemistry; standard and microscale*", $2^{nd}$ edition, Blackwell science Ltd, 1999, Oxford, United Kingdom, p. 129). The amount of covalently bound sulphur can be determined by measuring the total amount of sulphur using Schöniger combustion (Harris in "*Quantitative chemical analysis*", 6th edition, Freeman, 2003, New York, United States of America, p. 680), and subtracting the amount of sulphur as measured using ion chromatography (Skoog et al. in "*Analytical chemistry; an introduction*", 6th edition, Saunders College Publishing, 1994, United States of America, p. 486-521).

In an embodiment, a lignin compound or derivative thereof is used that is obtained according to a method wherein biomass is pre-treated with an aqueous solution of acid or base, and wherein subsequently saturated or super heated steam is passed through said biomass. During this process, the water activity can be controlled by means of temperature and pressure of the superheated steam to be less than 1, such as in the range of 0.4-0.8. The acid is preferably sulphuric acid. The base can be chosen from the group consisting of calcium hydroxide, sodium hydroxide potassium hydroxide, and ammonium hydroxide. The acid or base can also be formed in situ. Such a process is, for example, described in WO-A-2011/071386, the content of which is herewith completely incorporated by reference.

Chemically, lignin has a variety of functional groups, namely hydroxyl, methoxyl, carbonyl and carboxyl groups. Phenolic hydroxyl groups in the aromatic rings are the most reactive functional groups in the lignin and can significantly affect the chemical reactivity of the material. In accordance with the invention, the lignin compound or derivative thereof can be chemically modified. Preferably, the lignin compound or derivative thereof is rendered hydrophobic by chemical modification.

Various lignin derivatives are known and they will vary with the type of process used to separate native lignins from cellulose and other biomass constituents. Lignin preparations can, for example, be obtained by (1) solvent extraction of finely ground wood, (2) acidic dioxane extraction (acidolysis) of wood. Lignin derivatives can also be isolated from biomass pre-treated using (3) steam explosion, (4) dilute acid hydrolysis, (5) ammonia fibre expansion (AFEX), (6) autohydrolysis methods. Lignin derivatives can be recovered after biomass pre-treatment (e.g. pulping) of lignocellulosics including industrially operated kraft, soda pulping (and their modifications), or sulphite pulping. In addition, a number of various pulping methods have been developed but not industrially introduced. Among them four major "organosolv" pulping methods tend to produce highly-purified lignin mixtures. The first organosolv method uses ethanol/solvent pulping (aka the Lignol® (Alcell®) process); the second organosolv method uses alkaline sulphite anthraquinone methanol pulping (aka the "ASAM" process); the third organosolv process uses methanol pulping followed by methanol NaOH, and anthraquinone pulping (aka the "Organocell" process); the fourth organosolv process uses acetic acid/hydrochloric acid or formic acid pulping (aka the "Acetosolv" and "Formacell" processes). In an embodiment, the lignin compound or derivative thereof comprises an organosolv lignin derivative.

It should be noted that kraft pulping, sulphite pulping, and ASAM organosolv pulping will generate derivatives of lignin containing significant amounts of organically-bound sulphur. Acid hydrolysis, soda pulping, steam explosion, ethanol/solvent pulping, Organocell pulping (i.e. methanol pulping followed by methanol NaOH, and anthraquinone pulping), formic acid pulping, and acetic acid/hydrochloric acid pulping will generate lignin derivatives that are essentially sulphur-free or contain low amounts of inorganic sulphur. Accordingly, in an embodiment, the lignin compound or derivative thereof comprises a lignin derivative obtained by acid hydrolysis, soda pulping, steam explosion, ethanol/solvent pulping, anthraquinone pulping, formic acid pulping, and acetic acid/hydrochloric acid pulping.

Chemically-modified lignins can, for instance, be chosen from hydroxyalkylated lignins (such as hydroxypropylated lignin) and/or acylated lignins (such as an acetate ester) or other lignin derived materials. In such blends of chemically-modified lignins with certain thermoplastics, transesterification may occur with the replacement of one alcohol group in the ester linkage by another alcohol group. Accordingly, a hydroxyalkylated lignin may undergo transesterification with a nearby polyester macromolecule, thereby transferring a segment of the polyester onto the lignin. In addition, transesterification (or ester exchange) may occur with an acylated lignin (e.g. acylated). In this instance, an alkyl ester (such as an acetate ester) of the lignin may exchange carboxylic acid groups with an alcohol terminated segment of the polyester chain. Also it is possible to react lignin with activated compounds aiming at introducing ether linkages. For instance reacting hydroxyl group from lignin with activated reactants such as epoxides and/or halogenated alkanes and the like under alkaline conditions will result in the introduction of ether linkages. It is also possible to achieve radical induced chemistry carbon-carbon linkages. Typical epoxy carrying reactants are glycidyl ethers.

In a preferred embodiment, the chemically modified lignin is chemically modified with one or more selected from the group consisting of anhydrides, epoxy carrying reactants, and halide containing compounds.

Preferably, the chemically modified lignin compound comprises one or more units represented by formula (II) below

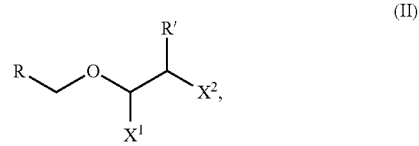

wherein
R represents a lignin residue;
R' is selected from $C_{1-20}$ alkyl, $C_{2-20}$ alkenyl, ($C_{1-20}$ alkyl)-phenyl, ($C_{2-20}$ alkenyl)-phenyl, $C_{1-20}$ alkoxy, ($C_{1-20}$ alkoxy)-phenyl, $C_{3-6}$ cycloalkyl, aryl-($C_{1-6}$ alkyl), aryl-($C_{2-6}$ alkenyl), and ($C_{1-4}$ alkyl)-aryl-($C_{1-4}$ alkyl);
$X^1$ is OH or H; and
$X^2$ is OH or H, and $X^2$ is different from $X^1$.

The chemically modified lignin compound can for instance comprise one or more units represented by formula (III) below

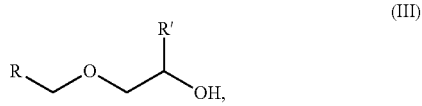

wherein R and R' have the same meaning as in formula (II) above.

The molecular weight of R' in formulae (II) and (III) is preferably 180 g/mol or less, more preferably 150 g/mol or less, such as in the range of 15-130 g/mol.

Preferably, the chemically modified lignin compound is substantially (and more preferably completely) free of ethylene oxide moieties.

Surprisingly it was found that a lignin compound that is chemically modified with epoxy carrying reactants and/or a lignin compound comprising one or more units represented by formula (II) or (III) gives favourable results in terms of mechanical properties of the bitumen composition of the invention. More in particular, it was found that the bitumen composition remained hard at high temperatures, while the obtained bitumen composition was softer at lower temperatures. In terms of paving properties, this means that in summertime (at relatively high temperatures) rutting is less likely to occur, while in wintertime (at relatively low temperatures) chippings are less likely to occur.

It is further advantageous in accordance with the invention if the lignin compound or derivative thereof has a relatively high molecular weight. This is particularly advantageous for the mechanical properties of the resulting bitumen composition.

The lignin compound preferably has a number average molecular weight in the range of 200-10 000 g/mol, preferably in the range of 350-5000 g/mol, more preferably in the range of 500-3000 g/mol. Such number average molecular weight can suitably be determined by gel permeation chromatography against a polystyrene standard.

In an embodiment, the lignin compound or derivative thereof preferably has a bimodal distribution of the molecular weight. This is advantageous in accordance with the present invention in order to match the molecular weight distribution of the bitumen. The lignin compound or derivative thereof can for example comprise a first component having a $M_n$ of 50 000-200 000 g/mol, preferably 75 000-125 000 g/mol, more preferably 100 000-150 000 g/mol. The lignin compound or derivative thereof can comprise a second component having a $M_n$ of 1000-2500 g/mol, preferably 1250-2250 g/mol, more preferably 1500-2000 g/mol. The first component may be present in the lignin compound or derivative thereof in an amount of 1-5 wt. % based on total weight of the lignin compound or derivative thereof. The second component may be present in the lignin compound or derivative thereof in an amount of 95-99 wt. % based on total weight of the lignin compound or derivative thereof. The number average molecular weights mentioned herein are as determined by gel permeation chromatography against a polystyrene standard.

The lignin compound or derivative thereof is preferably rendered hydrophobic. Hydrophilicity (or hydrophobicity) may be evaluated using standard contact angle measurements. In the case of lignin a pellet may be formed using a Fourier Transfer Infrared KBr pellet press. Then a water droplet is added onto the pellet surface and the contact angle between the water droplet and the lignin pellet is measured using a contact angle gionometer. As the hydrophilicity of lignins decreases (and the hydrophobicity of lignins increases) the contact angle increases. Preferably, the chemically modified lignin compound has a contact angle with water of 110° or more, preferably 120° or more, such as 130° or more.

The lignin compound or derivative may suitably be a chemically modified organosolv lignin compound having a phenolic hydroxyl content in the range of 2-8 mmol/g, preferably in the range of 2.5-7 mmol/g, more preferably in the range of 3-6 mmol/g.

The lignin compound or derivative may suitably be a chemically modified organosolv lignin compound having a total hydroxyl content in the range of 0.1-15 mmol/g, preferably in the range of 1-13 mmol/g, or in the range of 1.5-12 mmol/g, or in the range of 2-11 mmol/g, or in the range of 2.5-10 mmol/g. The total hydroxyl content refers to the quantity of hydroxyl groups in the chemically modified lignin compound and is the sum of the quantity of aliphatic and phenolic hydroxyl groups. The hydroxyl content can be measured by quantitative high resolution $^{13}$C-NMR spectroscopy using, for instance, 1,3,5-trioxane and tetramethyl silane (TMS) as internal reference.

Chemically modified organosolv lignin compounds useful for the invention can suitably be prepared by a method comprising
reacting an alkaline organosolv lignin compound with a glycidyl ether compound at a temperature in the range of 30-100° C., said glycidyl ether compound having a molecular weight of 250 g/mol or less;
neutralising the reaction mixture with acid; and
isolating the chemically modified lignin compound.

The reaction temperature is suitably in the range of 30-100° C., preferably in the range of 30-80° C., more preferably in the range of 40-60° C. The reaction may be carried out for 6-48 hours, preferably 12-36 hours.

After reacting, the reaction mixture is suitably cooled, neutralised, centrifuged, dialysed and freeze-dried to isolate the chemically modified organosolv lignin product.

In accordance with one aspect of the invention, 10 wt. % or more by weight of the lignin compound or derivative thereof is molecularly dissolved in the bitumen composition as determined at 25° C. Hence, this lignin is not present as particulate matter, but is dispersed in the bitumen composition on the molecular level. Preferably, 25 wt. % or more by weight of said lignin compound or derivative thereof is molecularly dissolved in said bitumen composition, more preferably 50 wt. % or 75 wt. %, such as 75-90 wt. %. In an embodiment, the lignin compound or derivative thereof is completely molecularly dissolved in the bitumen composition. The level of dissolution of the lignin compound or derivative thereof can be established as described hereinabove.

In accordance with a further aspect of the invention, the average particle size of the lignin compound or derivative thereof in the composition at 25° C. is 100 µm or less as determined by polarised light microscopy. It is favourable when the lignin or lignin compounds are homogeneously dispersed in the composition, and even more favourable if part of the lignin compound or derivative thereof is molecularly dissolved. The absence of large lignin particulates can be used as a measure for the degree of dispersion and/or dissolution of the lignin compound or derivative thereof. Preferably, the average particle size of the lignin compound or derivative thereof in the composition at 25° C. is 100 µm or less, more preferably 80 µm or less, such as in the range of 3-50 µm, 5-25, or 7-20 µm. In an embodiment, the bitumen composition of the invention is substantially (and preferably completely) free from particles that have an average particle diameter of 100 µm or more (when determined at 25° C.).

Bitumens may be produced by the distillation of crude oil residues. Different grades of bitumen (i.e. bitumens of different hardness and softening point) can be produced by removing different amounts of the lighter components of the residues in the distillation process. The greater the amount of lighter components removed, the harder the bitumen produced. A similar hardening effect can be achieved by blowing air through the residues at temperatures of 180-300° C. Bitumens produced in this way are called blown or air blown bitumens. As is well known in the industry, additives such as phosphoric acid or ferric chloride, may be optionally used in the blowing process.

The bitumen composition can comprise one or more additives, such as one or more selected from the group consisting of resins, oils, stabilisers, anti-statics, anti-stripping agents, fluxants, and flame retardants. The content of such and other components may be in the range of from 0-10 wt. %, based on the total weight of the bitumen composition.

The bituminous composition may also comprise one or more waxes. Suitable waxes are those having a congealing point of from 50-70° C. The congealing point of a wax can be determined according to ASTM standard D938. Suitable amounts of wax are from 0.1-75 wt. %, preferably from 5-60 wt. %, based on the total weight of the bitumen composition. Animal, insect, vegetable, synthetic and mineral waxes may be used with those derived from mineral oils being preferred. Examples of mineral oil waxes include bright stock slack wax, medium machine oil slack wax, high melting point waxes and microcrystalline waxes. In the case of slack waxes up to 25 wt. % of oil may be present. Additives to increase the congealing point of the wax may also be present.

In the absence of any further filler material, the dynamic viscosity ($\eta^*$) of the bitumen composition at 20° C., 10 rad/s can be in the range of $1.0 \times 10^4$-$5.0 \times 10^6$ Pa·s, as determined by dynamic shear rheometer. This dynamic viscosity is influenced on the one hand by the lignin and the lignin content and on the other hand also by the bitumen used. Generally, the dynamic viscosity increases with increasing lignin content and/or with increasing bitumen hardness.

The bitumen composition of the invention can further comprise one or more fillers. When fillers are added to a bitumen composition, the resulting composition is commonly referred to as mastic. Examples of suitable fillers include talc, calcium carbonate, carbon black, fly ash, slate dust, limestone, dolomite and siliceous fillers, such as clay, mica and other sheet silicates. Mixtures of different fillers may be used. Preferably, calcium carbonate is used as filler. The amount of filler can be more than 40 wt. %, suitably less than 80 wt. %, based on the total weight of the bitumen composition. Preferably, the amount of filler is 50-75 wt. %, more preferably 60-70 wt. %. The bitumen composition may also be coloured by adding pigments thereto.

If desired, the bituminous composition may further comprise fibres, such as cellulose, glass and rock fibres. Typically, the bitumen composition may contain up to 25 wt. % of fibres, based on the total weight of the bitumen composition.

In an embodiment, a bitumen composition of the invention comprises:
40-90 wt. % of bitumen; and
10-60 wt. % of lignin compound or derivative thereof, of which 10 wt. % or more by weight of said lignin compound or derivative thereof is molecularly dissolved in said bitumen composition as determined at 25° C. and/or wherein the average particle size of the lignin compound or derivative thereof in the composition at 25° C. is 100 µm or less as determined by polarised light microscopy.

More preferably, a bitumen composition of the invention comprises:
50-80 wt. % of bitumen; and
20-50 wt. % of lignin compound or derivative thereof, of which 10 wt. % or more by weight of said lignin compound or derivative thereof is molecularly dissolved in said bitumen composition as determined at 25° C. and/or wherein the average particle size of the lignin compound or derivative thereof in the composition at 25° C. is 100 µm or less as determined by polarised light microscopy.

Bitumens are typically characterised according to their penetration at 25° C. (i.e. hardness), measured in mm/10 (European Standard EN 1427) and their softening point in ° C. (European Standard EN 1426). Harder bitumens have lower penetrations than soft bitumens. Softening points are higher for harder bitumens.

Depending on the application, the bitumen composition of the invention may have a penetration of 5-50 mm/10, such as 10-50 mm/10. Depending on the type of bitumen used, the softening point of the bitumen composition may be 50-75° C., such as 55-75° C.

Depending on the type of bitumen used and the lignin content, the bitumen composition of the invention can have a complex modulus G* at 20° C. and $1 \times 10^{-4}$ rad/s in the range of $1 \times 10^1$-$1 \times 10^5$ Pa, at 20° C. and 1 rad/s in the range of $1 \times 10^5$-$1 \times 10^8$ Pa, and at 20° C. and $1 \times 10^5$ rad/s in the range of $1 \times 10^7$-$1 \times 10^9$ Pa, as determined by dynamic shear rheometer. DSR (Dynamic Shear Rheometer). The bitumen composition of the invention can have a corresponding phase angle δ at 20° C. and $1 \times 10^{-4}$ rad/s in the range of 30-90°, at 20° C. and 1 rad/s in the range of 50-80°, and at 20° C. and $1 \times 10^5$ rad/s in the range of 10-40°, as determined by dynamic shear rheometer.

The inventors found that the addition of the lignin compound or derivative thereof to a bitumen composition allows for tuning the mechanical and other physical properties of bitumen composition. Not only can the lignin improve the stiffness of the bitumen composition, but also other properties can be tuned to the specific application. In particular, this can be done by introducing specific modifications into the lignin and by changing the relative amount and nature of those modifications.

The bitumen composition of the invention can be used for many applications, including paving and roofing.

For a paving, the bitumen composition is mixed with aggregates. The type and amount of aggregate in a bitumen composition for paving can vary. Typically, a mixture of bitumen composition and aggregates used for paving applications has a content of bitumen composition of 10 wt. % or less, such as 0.5-8 wt. %, or 1-6 wt. % based on the total weight of the mixture. Aggregate provides structural reinforcement and durability to the pavement material. The aggregates or filler can be selected depending on the grading, strength, toughness, and stability for the pavement. Aggregates include a variety of materials in a variety of shapes and sizes. Examples of aggregates include limestone, granite, sand, gravel, crushed stone, slag, recycled asphalt concrete, and the like. Another example of aggregates are mineral fillers, which are typically very fine, inert materials that are added to paving, such as hot mix asphalt, to improve the density and strength of the mixture. Examples of mineral fillers include rock dust, slag dust, hydrated lime, hydraulic cement, fly ash, fibres, and the like. Other common components that can be added for paving applications are organic and inorganic fibres, such as glass, metal or carbon fibres, as well as cellulose, cotton, polypropylene, polyester, polyvinyl alcohol, and polyamide fibres.

When such bitumen composition for paving is applied on a surface, a paving results with improved properties as mentioned herein.

Hence, a further aspect of the invention is directed to a paving comprising the bitumen composition of the invention. In particular, the invention relates to a surface, which is coated in whole or in part with a bitumen composition as described herein, said surface being preferably a rolling surface, such as roads, parking lots, bridges, motorways, highways, airport runways or any similar rolling surface, and also any surface requiring bitumen or paving coating, such as pavements, side walks, playgrounds and the like.

The bitumen composition of the invention may also be used for roofing. Typically, a mixture of bitumen composition and aggregates used for roofing applications has a content of bitumen composition of 60 wt. % or less, such as 10-50 wt. %, or 20-50 wt. % based on the total weight of the mixture. When used for roofing the bitumen composition can typically comprise one or more additives selected from fire retardants, waxes, anti-stripping agents, cellulose, adhesion promoters, etc.

For roofing applications, it is commonly known to add polymer modifiers to the bitumen compositions. Examples of such polymer modifiers include styrene-butadiene-styrene copolymers, styrene-butadiene copolymers, styrene block copolymer, styrene-butadiene-rubber, atactic polypropylene, functionalised polyolefins, reactive ethylene terpolymers In yet a further aspect, the invention is directed to a roofing comprising the bitumen composition of the invention.

In a further aspect, the invention is directed to a method of preparing a bitumen composition, said method comprising dissolving 10 wt. % or more by weight of a lignin compound or derivative thereof into a bitumen composition, preferably 25 wt. % or more. Preferably, the bitumen composition is a bitumen composition as defined herein. The lignin compound or derivative can be blended into the bitumen by any conventional means. Some agitation is favourable in order to quickly dissolve the required amount of lignin or derivative thereof. This may be achieved by mixing, such as using a propeller mixer or a high shear mixer. Such a mixer can be operated at typically 200-8000 rpm, such as 300-6000 rpm, depending on the type of bitumen and application type.

Typically, during mixing the bitumen is heated to a temperature of 120° C. or more, such as 130° C. or more, or 140° C. or more. The bitumen can for instance be heated to a temperature in the range of 140-200° C., dependant on the type of bitumen. The mixing may last for about 5-60 minutes, such as 10-30 minutes.

Preferably, the lignin is added to the pre-heated bitumen very gradually in small batches using a sieve, and a new batch of lignin is only added when the previous batch is consumed. After all lignin has been added, the mixture is suitably homogenised for about 10-30 minutes while mixing at elevated temperature.

In an exemplary method for preparing a bitumen composition for paving applications, a bitumen (70/100) can be used which is heated to about 170° C., or a bitumen (160/220) can be used which is heated to about 160° C. Heating can be done with a heating plate and the bitumen is mixed for about 15 minutes at 500 rotations per minute using a propeller mixer. Lignin can then gradually be added to the bitumen (e.g. with a sieve) while mixing with a propeller mixer at about 500 rotations per minute. After all the lignin has been added, the bitumen composition can be homogenised by mixing at about 500 rotations per minute for about 30 minutes.

In an exemplary method for preparing a bitumen composition for roofing applications, a bitumen (160/220) can be used which is heated to about 180° C. Heating can be done with a heating plate and the bitumen is mixed for about 15 minutes at up to 5000 rotations per minute using a high shear mixer. Styrene-butadiene-styrene copolymer can then gradually be added to the bitumen while mixing at about 5000 rotations per minute. After all the Styrene-butadiene-styrene copolymer has been added, lignin can gradually be added to the bitumen (e.g. with a sieve) while mixing at about 5000 rotations per minute. Thereafter, the bitumen composition can be homogenised by mixing at about 5000 rotations per minute for about 1 hour.

In yet a further aspect, the invention is directed to a method of increasing the stiffness of a bitumen composition, said method comprising molecularly dissolving a lignin compound or derivative thereof in said bitumen composition.

The inventors surprisingly found that molecularly dissolving a lignin compound or derivative thereof in a bitumen composition improves the stiffness of the composition. The method can be carried out as described above for the method of preparing the bitumen composition.

In yet a further aspect, the invention is directed to a method of adjusting the physical properties of a bitumen composition, said method comprising adding to the bitumen composition comprising a lignin compound or derivative thereof, wherein said lignin compound or derivative thereof is optionally chemically modified. Preferably, the method concerns a bitumen composition wherein 10 wt. % or more by weight of said lignin compound or derivative thereof is molecularly dissolved in the bitumen composition. As shown in the examples, the addition of a lignin compound or derivative thereof to a bitumen composition can change the physical properties (such as the stiffness and/or complex modulus G*). By chemically modifying the lignin compound or derivative thereof, it is possible to tune the respective physical properties to the needs for a specific application.

In yet a further aspect, the invention is directed to the use of a bitumen composition as described herein as a stiffness improver in a paving or roofing.

For the purpose of clarity and a concise description features are described herein as part of the same or separate embodiments, however, it will be appreciated that the scope of the invention may include embodiments having combinations of all or some of the features described.

The invention will now be further elucidated by means of the following examples which are not meant to limit the invention in any manner.

EXAMPLES

Synthesis Example 1

100 grams of organosolv lignin was added to 1 l 0.1 M sodium hydroxide solution in water at 50° C. and subsequently 26 ml ethylhexyl glycidyl ether was added. After 24 hours, the mixture was cooled, neutralised, centrifuged, dialysed and freeze-dried after which the product was isolated and used in follow up experiments. The yield was 120 grams.

Synthesis Example 2

100 grams of organosolv lignin was added to 1 l 0.1 M sodium hydroxide solution in water at 50° C. and subsequently 15 ml allyl glycidyl ether was added. After 24 hours the mixture was cooled, neutralised, centrifuged, dialysed and freeze-dried after which the product was isolated and used in follow up experiments. The yield was 65 grams.

Synthesis Example 3

100 grams of organosolv lignin was added to 1 l 0.1 M sodium hydroxide solution in water at 50° C. and subsequently 17 ml 1,2-epoxy-3-phenoxy propane ether was added. After 24 hours, the mixture was cooled, neutralised, centrifuged, dialysed and freeze-dried after which the product was isolated and used in subsequent experiments. The yield was 85 grams.

Synthesis Example 4

100 grams of organosolv lignin was added to 1 l 0.1 M sodium hydroxide solution at 50° C. and subsequently 26 ml ethylhexyl glycidyl ether was added. After 24 hours, the mixture was cooled, centrifuged, dialysed and freeze-dried after which the product was isolated and used in follow up experiments. The yield was 52 grams.

Synthesis Example 5

100 grams of organosolv lignin was added to 1 l 0.1 M sodium hydroxide solution at 50° C. Subsequently 10 gram sodiumborohydride were added. After 24 hours, the mixture was cooled down, centrifuged, dialysed and freeze-dried after which the product was isolated and used in follow up experiments. The yield was 45 grams.

Comparative Synthesis Example

To 1 l 0.1 M sodium hydroxide solution at 50° C., 26 ml ethylhexyl glycidyl ether was added. After 24 hours, the mixture was cooled, centrifuged, dialysed and freeze-dried exactly as the earlier lignin containing products were isolated. The result was that no polymeric product was present. The yield was 20 milligrams.

Example 1

Bitumen (70/100) was heated to about 170° C. Heating was done with a heating plate and the bitumen was mixed for about 15 minutes at 500 rotations per minute using a propeller mixer. Lignin (10 wt. %) was gradually added (in small batches) to the bitumen (with a sieve) while mixing with a propeller mixer at about 1000 rotations per minute. After all the lignin was added, the bitumen composition was homogenised by mixing at about 1000 rotations per minute for about 15 minutes at 170° C.

The average particle diameter in the bitumen composition directly after mixing and after 15 minutes of mixing was determined using polarised light microscopy. A comparison showed that after 15 minutes of mixing essentially all particles have disappeared, thereby indicating that the average particle diameter in the bitumen composition after 15 minutes of mixing is substantially less than 25% of the average particle diameter in the bitumen composition directly after mixing the components together.

Example 2

Bitumen (160/220) was heated to about 160° C. Heating was done with a heating plate and the bitumen was mixed for about 15 minutes at 500 rotations per minute using a propeller mixer. Lignin (10 wt. %) was gradually added (in small batches) to the bitumen (with a sieve) while mixing with a propeller mixer at about 1000 rotations per minute. After all the lignin was added, the bitumen composition was homogenised by mixing at about 1000 rotations per minute for about 15 minutes at 160° C.

Again, the average particle diameter in the bitumen composition directly after mixing and after 15 minutes of mixing was determined using polarised light microscopy. A comparison showed that after 15 minutes of mixing essentially all particles have disappeared, thereby indicating that the average particle diameter in the bitumen composition after 15 minutes of mixing is substantially less than 25% of the average particle diameter in the bitumen composition directly after mixing the components together.

FIG. 1 shows complex modulus of three different bitumen compositions (one conventional bitumen composition without lignin, one bitumen composition that contains 25 wt. % of native lignin, one bitumen composition that contains 25 wt. % of lignin modified with the aliphatic epoxy carrying reactants prepared in synthesis example 1, and one bitumen composition that contains 25 wt. % of lignin modified with the aromatic epoxy carrying reactants prepared in synthesis example 3). This FIGURE shows that the inclusion of lignin in the bitumen composition does affect the properties of the bitumen composition, but not to a large extent. By modification of the lignin, the complex modulus properties of the bitumen can further be tuned.

Dynamic shear tests were conducted using a Rheometrics RAA asphalt analyser—Dynamic Shear Rheometer (DSR). The DSR test was basically conducted to determine the viscoelastic properties, i.e. the response or dependence of the materials on temperature and loading time. In this regard, the complex modulus and phase angle at different temperatures and loading frequencies were determined.

The specimen was placed between two circular parallel plates. The upper plate was fixed; while the lower part oscillated applying the shear strain during testing. The test was carried out in a temperature controlled mini-oven (chamber). The temperature of the sample was controlled with air, for temperatures above 20° C. the sample was heated using hot air, for temperatures below 20° C. cooled air was used. The temperature control has an accuracy of ±0.1° C. when adequate time (usually 10 min) is provided to stabilise the temperature. The temperature of the sample was measured in the plate. The controlling mechanism and data acquisition was performed by a computer connected to the DSR equipment.

In the DSR test, the bituminous materials were subjected to a sinusoidal loading of constant strain at different loading frequencies (frequency sweep). The frequency sweep test was conducted at eight different temperatures ranging between −10° C. and 60° C. Every test was carried out at frequencies ranging between 0.1-400 rad/s. Before conducting the frequency sweep tests (constant strain, varying frequency), a strain sweep test (constant frequency, varying strain) was performed to determine the strain level at which the material response remains in the linear region. Two parallel plate geometries with a diameter of 8 mm and 25 mm were used. Table 1 provides the testing conditions used in the DSR.

TABLE 1

| DSR test conditions | |
|---|---|
| Temperatures | −10, 0, 10, 20, 30, 40, 50 and 60° C. ± 0.1° C. |
| Parallel plates | 8 mm; 25 mm |
| Sample thickness | 2 mm; 1 mm target thickness |
| Frequency | 0.1-400 rad/s |

Figure 2:
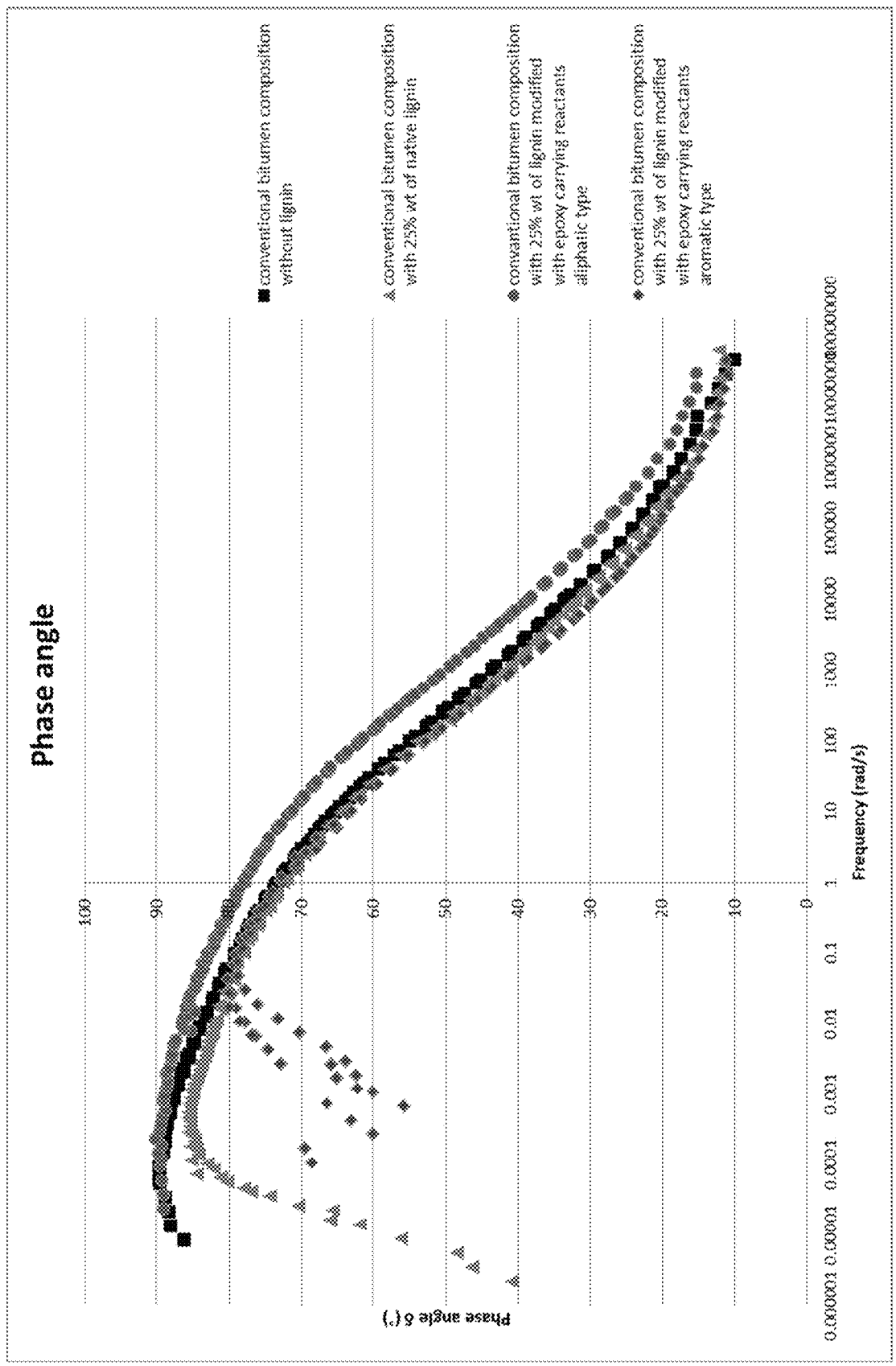
FIG. 2 is a graph illustrating the phase angle of three different bitumen compositions described in Example 2.

A better understanding and analysis of rheological properties of viscoelastic materials can be made with the use of master curves. Master curves allow the estimation of properties at a wider range of temperatures and frequencies. The complex modulus master curve and the phase angle master curve were constructed. The Time-Temperature Superposition (TTS) principle was used to generate master curves of the complex modulus and phase angle at a reference temperature of 20° C. These master curves are shown in FIGS. 1 and 2.

The invention claimed is:

1. Bitumen composition comprising a lignin compound or derivative thereof, wherein 25 wt. % or more by weight of said lignin compound or derivative thereof is molecularly dissolved in said bitumen composition,
   wherein the molecularly dissolved lignin compound or derivative thereof has an average particle size of 100 µm or less,
   wherein said lignin compound or derivative thereof is a chemically modified lignin, and
   wherein said chemically modified lignin is chemically modified with one or more groups selected from anhydrides, epoxy carrying reactants, and halide containing compounds.

2. Bitumen composition according to claim 1, wherein said composition comprises 10 wt. % or more by weight of the bitumen composition of said lignin compound or derivative thereof.

3. Bitumen composition according to claim 1, wherein said composition comprises 20 wt. % or more by weight of the bitumen composition of said lignin compound or derivative thereof.

4. Bitumen composition according to claim 1, wherein said composition comprises 25-50 wt. % by weight of the bitumen composition of said lignin compound or derivative thereof.

5. Bitumen composition according to claim 1, wherein said lignin compound or derivative thereof is substantially free of sulfur.

6. Bitumen composition according to claim 1, wherein said lignin compound or derivative thereof is completely free of sulfur.

7. Bitumen composition according to claim 1, wherein said chemically modified lignin compound comprises one or more units represented by formula (II) below

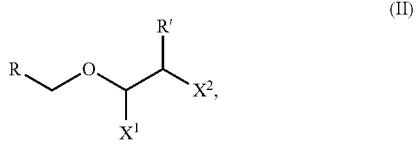

wherein
R represents a lignin residue;
R' is selected from the group consisting of $C_{1-20}$ alkyl, $C_{2-20}$ alkenyl, ($C_{1-20}$ alkyl)-phenyl, ($C_{2-20}$ alkenyl)-phenyl, $C_{1-20}$ alkoxy, ($C_{1-20}$ alkoxy)-phenyl, $C_{3-6}$ cycloalkyl,
aryl-($C_{1-6}$ alkyl), aryl-($C_{2-6}$ alkenyl), and ($C_{1-4}$ alkyl)-aryl-($C_{1-4}$ alkyl);
$X^1$ is OH or H; and
$X^2$ is OH or H, and $X^2$ is different from $X^1$.

8. Bitumen composition according to claim 1, wherein said lignin compound or derivative thereof has a bimodal distribution of molecular weight.

9. Bitumen composition according to claim 1, wherein the lignin compound or derivative thereof comprises 1-5 wt. % based on total weight of the lignin compound or derivative thereof of a first component having a $M_n$ of 100,000-150,000 g/mol and 95-99 wt. % based on total weight of the lignin compound or derivative thereof of a second component having a $M_n$ of 1500-2000 g/mol.

10. Bitumen composition according to claim 1, wherein 50 wt. % or more by weight of said lignin compound or derivative thereof is molecularly dissolved in said bitumen composition.

11. Bitumen composition according to claim 1, wherein 75 wt. % or more by weight of said lignin compound or derivative thereof is molecularly dissolved in said bitumen composition.

12. Bitumen composition according to claim 1, having a dynamic viscosity ($\eta^*$) at 20° C. and 10 rad/s in the range of
$1.0 \times 10^4$-$5.0 \times 10^6$, as determined by dynamic shear rheometer.

13. Bitumen composition according to claim 1,
having a complex modulus G*:
   at 20° C. and $1 \times 10^{-4}$ rad/s in the range of $1 \times 10^1$-$1 \times 10^5$ Pa,
   at 20° C. and 1 rad/s in the range of $1 \times 10^5$-$1 \times 10^8$ Pa, and
   at 20° C. and $1 \times 10^5$ rad/s in the range of $1 \times 10^7$-$1 \times 10^9$ Pa;
having a corresponding phase angle δ:
   at 20° C. and $1 \times 10^{-4}$ rad/s in the range of 30-90°,
   at 20° C. and 1 rad/s in the range of 50-80°, and
   at 20° C. and $1 \times 10^5$ rad/s in the range of 10-40°,
as determined by dynamic shear rheometer.

14. Bitumen composition according to claim 1, further comprising one or more selected from the group consisting of a filler, sand, and rubble.

15. Paving comprising a bitumen composition according to claim 1.

16. Roofing comprising a bitumen composition according to claim 1.

17. Method of preparing a bitumen composition comprising molecularly dissolving 25 wt. % or more by weight of a lignin compound or derivative thereof into a bitumen composition, wherein the molecularly dissolved lignin compound or derivative thereof has an average particle size of 100 µm or less, wherein said lignin compound or derivative thereof is a chemically modified lignin, and wherein said chemically modified lignin is chemically modified with one or more groups selected from anhydrides, epoxy carrying reactants, and halide containing compounds.

18. Method according to claim 17, wherein said lignin compound or derivative thereof is substantially or completely free of sulfur.

* * * * *